(12) United States Patent
Li

(10) Patent No.: US 12,368,793 B2
(45) Date of Patent: Jul. 22, 2025

(54) FOLDABLE SCREEN AND TERMINAL DEVICE

(71) Applicant: XI'AN WINGTECH ELECTRONICS TECHNOLOGY CO., LTD., Shaanxi (CN)

(72) Inventor: Wenjie Li, Shaanxi (CN)

(73) Assignee: XI'AN WINGTECH ELECTRONICS TECHNOLOGY CO., LTD., Shaanxi (CN)

(*) Notice: Subject to any disclaimer, the term of this patent is extended or adjusted under 35 U.S.C. 154(b) by 491 days.

(21) Appl. No.: 17/911,216

(22) PCT Filed: Nov. 24, 2020

(86) PCT No.: PCT/CN2020/131217
§ 371 (c)(1),
(2) Date: Sep. 13, 2022

(87) PCT Pub. No.: WO2021/179681
PCT Pub. Date: Sep. 16, 2021

(65) Prior Publication Data
US 2023/0104914 A1 Apr. 6, 2023

(30) Foreign Application Priority Data
Mar. 13, 2020 (CN) .......................... 202010177849.1

(51) Int. Cl.
H04M 1/02 (2006.01)
G06F 1/16 (2006.01)
G09F 9/30 (2006.01)

(52) U.S. Cl.
CPC ........ *H04M 1/0268* (2013.01); *G06F 1/1618* (2013.01); *G06F 1/1641* (2013.01);
(Continued)

(58) Field of Classification Search
CPC ............. H04M 1/0222; H04M 1/0262; H04M 2201/38; H04M 1/0214; G06F 1/1618;
(Continued)

(56) References Cited

U.S. PATENT DOCUMENTS 10,110,717 B1 10/2018 Yongbiao
2008/0025456 A1* 1/2008 Sandy .................. G01C 22/006
377/24

(Continued)

FOREIGN PATENT DOCUMENTS

CN 102150096 A 8/2011
CN 104867406 A 8/2015
(Continued)

OTHER PUBLICATIONS

International Search Report and Written Opinion from PCT/CN2020/131217 dated Feb. 20, 2021.

*Primary Examiner* — Charles N Appiah
*Assistant Examiner* — Nikita H Patel
(74) *Attorney, Agent, or Firm* — Calfee, Halter & Griswold LLP

(57) ABSTRACT

Disclosed are a foldable screen and a terminal device, which relate to the technical field of flexible foldable screens. The foldable screen comprises a screen body and right-angle folding hinges; the right-angle folding hinges are arranged along middle lines and one diagonal of the screen body; and the screen body has a fully unfolded state, and the screen body is capable of being folded by means of the right-angle folding hinge, such that the screen body is selectively folded to form a first folded state or a second folded state. In the first folded state, a single-sided display area of the screen body is a half of an area of the screen body in the fully unfolded state; and in the second folded state, the single-sided display area of the screen body is a quarter of the area of the screen body in the fully unfolded state.

20 Claims, 4 Drawing Sheets

(52) U.S. Cl.
CPC .......... *G06F 1/1652* (2013.01); *G06F 1/1681* (2013.01); *G09F 9/301* (2013.01); *H04M 1/0214* (2013.01); *H04M 1/0222* (2013.01); *H04M 1/0262* (2013.01); *H04M 2201/38* (2013.01)

(58) Field of Classification Search
CPC .... G06F 1/1641; G06F 1/1652; G06F 1/1681; G09F 9/301
See application file for complete search history.

(56) References Cited

U.S. PATENT DOCUMENTS

| | | | |
|---|---|---|---|
| 2010/0064536 A1* | 3/2010 | Caskey | G06F 1/1694 33/303 |
| 2016/0372083 A1* | 12/2016 | Taite | G06F 3/04886 |
| 2020/0075895 A1 | 3/2020 | Minju et al. | |
| 2020/0267858 A1* | 8/2020 | Kim | F16C 11/04 |
| 2020/0343313 A1* | 10/2020 | Lee | G06F 3/044 |
| 2021/0168952 A1* | 6/2021 | Ko | G06F 1/1681 |

FOREIGN PATENT DOCUMENTS

| | | | | |
|---|---|---|---|---|
| CN | 107331305 A | | 11/2017 | |
| CN | 107508932 A | | 12/2017 | |
| CN | 207068364 U | | 3/2018 | |
| CN | 110233326 A | * | 9/2019 | ............... H01Q 1/22 |
| CN | 111416893 A | | 7/2020 | |
| WO | 2002008876 A2 | | 1/2002 | |
| WO | WO-2020211532 A1 | * | 10/2020 | ........... G06F 1/1641 |

* cited by examiner

FOLDABLE SCREEN AND TERMINAL DEVICE

CROSS-REFERENCE TO RELATED APPLICATION

This present application is based upon International Application No. PCT/CN2020/131217, filed on Nov. 24, 2020, which claims the priority of the Chinese patent application filed on Mar. 13, 2020 before the Chinese Patent Office with the application number of 202010177849.1 and titled "FOLDABLE SCREEN AND TERMINAL DEVICE", the entire contents of which are incorporated herein by reference.

TECHNICAL FIELD

The present disclosure relates to the technical field of flexible foldable screens, and more particularly, to a foldable screen and a terminal device.

BACKGROUND

Electronic devices are usually equipped with screens to display images and colors. With the continuous development of the electronic devices, various requirements are put forward for screens.

In the course of research, it is found by the inventor that screens of traditional electronic devices at least have the following problems: the screen sizes are fixed, and cannot be adjusted, so the flexibility is not high, which cannot meet the needs of users for flexible adjustment of the screen sizes in different application scenarios, and the user experience needs to be further improved.

SUMMARY

The present disclosure provides a foldable screen, which is capable of folding a screen body to change an area of one side of the screen body to adapt to different use scenes, so that the foldable screen has flexible functions and is convenient to use.

The present disclosure further provides a terminal device, which includes the foldable screen above, and the terminal device is capable of changing the area of one side of the screen body, so that the terminal device has a plurality of usage forms and various functions, and improves the user experience.

Embodiments of the present disclosure may be implemented in this way:

In a first aspect, an embodiment of the present disclosure provides a foldable screen, which includes a screen body and a plurality of right-angle folding hinges, wherein the plurality of right-angle folding hinges are arranged along middle lines and one diagonal of the screen body; and the screen body has a fully unfolded state, and the screen body is capable of being folded by means of the right-angle folding hinge, such that the screen body is selectively folded to form a first folded state or a second folded state; and in the first folded state, a single-sided display area of the screen body is a half of an area of the screen body in the fully unfolded state; and in the second folded state, the single-sided display area of the screen body is a quarter of the area of the screen body in the fully unfolded state.

In an optional embodiment, the right-angle folding hinges include a first folding hinge and a second folding hinge, the screen body is square, the screen body includes a first side edge and a second side edge which are oppositely arranged, and the first folding hinge and the second folding hinge are arranged at intervals on a middle line of the first side edge and the second side edge.

In an optional embodiment, the right-angle folding hinges include a third folding hinge and a fourth folding hinge, the screen body further includes a third side edge and a fourth side edge which are oppositely arranged, and the third folding hinge and the fourth folding hinge are arranged at intervals on a middle line of the third side edge and the fourth side edge.

In an optional embodiment, the right-angle folding hinges include a fifth folding hinge and a sixth folding hinge, and the fifth folding hinge and the sixth folding hinge are arranged at intervals on one diagonal of the screen body.

In an optional embodiment, the screen body is further provided with a plurality of central folding hinges; and the plurality of right-angle folding hinges are respectively located at peripheries of the plurality of central folding hinges.

In an optional embodiment, the central folding hinges further include a first central hinge, a second central hinge, a third central hinge and a fourth central hinge, and the screen body includes a first side edge, a third side edge, a second side edge and a fourth side edge which are connected end to end; the first central hinge and the second central hinge are arranged at intervals on a middle line of the first side edge and the second side edge; and the third central hinge and the fourth central hinge are arranged at intervals on a middle line of the third side edge and the fourth side edge.

In an optional embodiment, the central folding hinges further include a fifth central hinge and a sixth central hinge, and the fifth central hinge and the sixth central hinge are arranged at intervals on one diagonal of the screen body.

In a second aspect, this embodiment provides a terminal device, including a battery module, a circuit module and the foldable screen according to any one of the embodiments mentioned above, wherein the battery module and the circuit module are both arranged on the foldable screen, and the battery module is electrically connected to the circuit module.

In an optional embodiment, the circuit module and the battery module are arranged on the same side of the screen body, and are respectively arranged on two opposite corners of the screen body.

In an optional embodiment, the screen body is square, and the screen body includes a first diagonal and a second diagonal, wherein two right-angle folding hinges are arranged along the first diagonal, and the circuit module and the battery module are arranged along the second diagonal.

Compared with the prior art, the foldable screen and the terminal device provided by the embodiments of the present disclosure have the beneficial effects that, for example:

according to the foldable screen provided by the embodiments of the present disclosure, the screen body is provided with the right-angle folding hinges, so that the screen body has the fully unfolded state when being unfolded, and the first folded state and the second folded state after being selectively folded along the right-angle folding hinges, such that half folding and quarter folding of the single-side area of the screen body can be realized. The foldable screen has three usage forms, and the single-side area of the screen body is respectively the full screen, the half screen and the quarter screen, which is convenient for users to switch the usage forms of the foldable screen in different usage scenarios, so that the foldable screen is flexible and convenient to use, and is easy to carry.

The terminal device provided by the embodiments of the present disclosure include the foldable screen above, has a plurality of usage forms, is convenient to use, has flexible and diverse functions, is wide in application range, is beneficial to improving the user experience, and has great popularization and application values.

BRIEF DESCRIPTION OF THE DRAWINGS

In order to more clearly illustrate the technical solutions of the embodiments of the present disclosure, the drawings that are required to describe the embodiments will be briefly introduced below. It should be understood that the drawings below only illustrate some embodiments of the present disclosure, and should not be regarded as limiting the scope. Those having ordinary skills in the art can obtain other related drawings according to these drawings without paying creative work.

Figure 1:
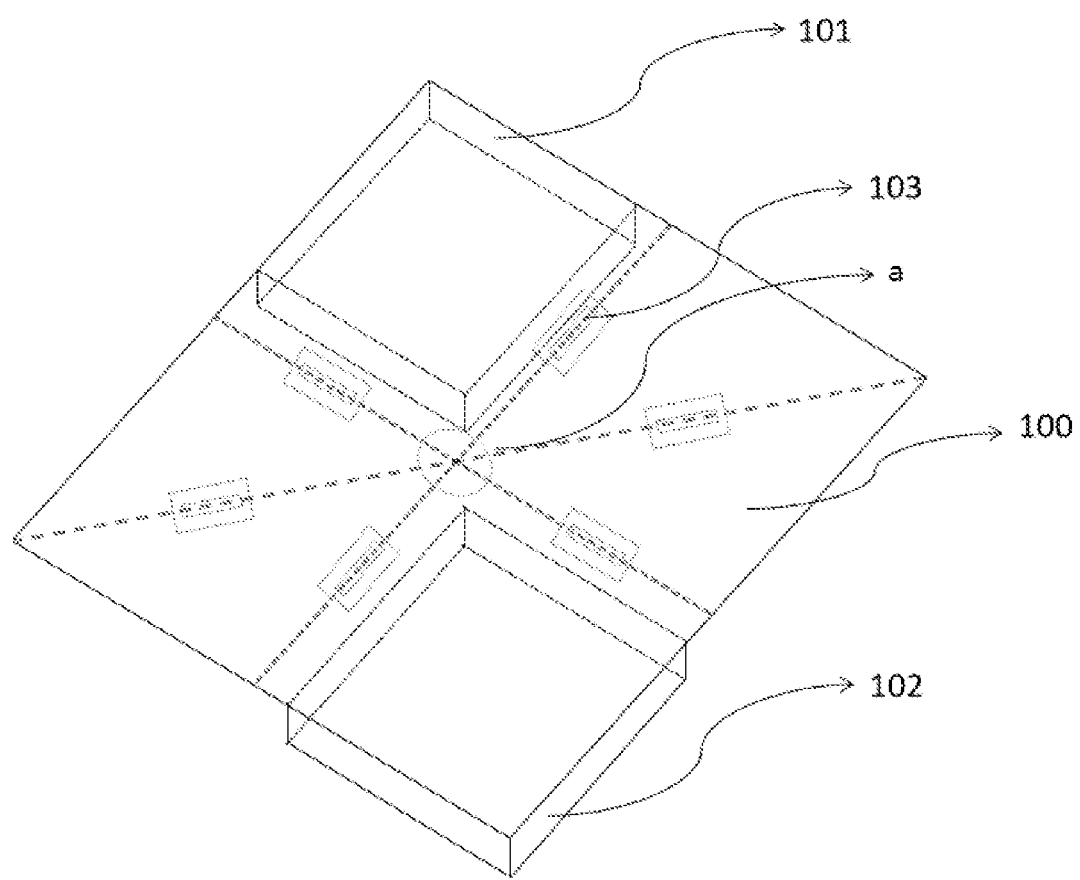
FIG. 1 is a schematic diagram of an overall structure of a terminal device provided by a specific embodiment of the present disclosure.

Reference numerals: 10 refers to terminal device; 100 refers to foldable screen; 101 refers to circuit module; 102 refers to battery module; 103 refers to right-angle folding hinge; 11 refers to first folding hinge; 12 refers to second folding hinge; 13 refers to third folding hinge; 14 refers to fourth folding hinge; 15 refers to fifth folding hinge; 16 refers to sixth folding hinge; 110 refers to screen body; 111 refers to front face; 112 refers to back face; 113 refers to first side edge; 114 refers to second side edge; 115 refers to third side edge; 116 refers to fourth side edge; 21 refers to first central hinge; 22 refers to second central hinge; 23 refers to third central hinge; 24 refers to fourth central hinge; 25 refers to fifth central hinge; and 26 refers to sixth central hinge.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. Components of the embodiments of the present disclosure, which are generally described and illustrated in the drawings herein, can be arranged and designed in various different configurations.

Therefore, the following detailed description of the embodiments of the present disclosure provided in the drawings is not intended to limit the scope of the present disclosure claimed, but merely represents selected embodiments of the present disclosure. All of the other embodiments that those having ordinary skills in the art obtain on the basis of the embodiments of the present disclosure without paying creative work fall within the protection scope of the present disclosure.

It should be noted that similar reference numerals and letters indicate similar items in the following drawings, so once one item is defined in one drawing, it does not need to be further defined and explained in the following drawings.

In the description of the present disclosure, it should be noted that if the orientation or positional relationship indicated by the terms "upper", "lower", "inner", "outer" and the like is based on the orientation or positional relationship shown in the drawings, or the orientation or positional relationship that the product of the present disclosure is usually placed when in use, it is only for the convenience of describing the present disclosure and simplifying the description, and it is not to indicate or imply that the indicated apparatus or element must have a specific orientation, or be constructed and operated in a specific orientation. Therefore, the terms should not be construed as limiting the present disclosure.

Moreover, if the terms "first" and "second" appear, they are used to distinguish descriptions only and cannot be understood as indicating or implying relative importance.

It should be noted that, in case of no conflict, the features in the embodiments of the present disclosure may be mutually combined with each other.

With reference to FIG. 1, this embodiment provides a terminal device 10, including a battery module 102, a circuit module 101 and a foldable screen 100. The battery module 102 and the circuit module 101 are both arranged on the foldable screen 100, and the battery module 102 is electrically connected to the circuit module 101. The foldable screen 100 is mainly based on an OLED flexible screen. The battery module 102 is configured to supply power to the circuit module 101, and the circuit module 101 is configured to control the OLED to emit light and light up the screen. Of course, it is not limited to this, and the foldable screen 100 may also be based on other types of display screens, which are not specifically limited here. It is easy to understand that the terminal device 10 may be an electronic device such as a mobile phone, a notebook computer, or a display device in other fields, for example, applied to an advertisement screen; alternatively, the terminal device 10 may be applied to the uniform of traffic police to play a warning role; alternatively, the terminal device may also be used on packaging boxes and other objects to play the role of prompting, publicizing or decorating.

Optionally, this embodiment provides a foldable screen 100, which includes a screen body 110, right-angle folding hinges 103 and a central folding hinge. The screen body 110 includes a first region a in the center and a second region between the center and an edge. The central folding hinge is arranged in the first region a, and the right-angle folding hinges 103 are arranged in the second region. Specifically, a plurality of right-angle folding hinges 103 are provided, and the plurality of right-angle folding hinges 103 are respectively arranged along middle lines and one diagonal of the screen body 110. The screen body 110 has a fully unfolded state, and the screen body 110 is capable of being folded by means of the right-angle folding hinge 103, such that the screen body 110 is selectively folded to form a first folded state or a second folded state. In the first folded state, a single-sided display area of the screen body 110 is a half of an area of the screen body 110 in the fully unfolded state; and in the second folded state, the single-sided display area of the screen body 110 is a quarter of the area of the screen body 110 in the fully unfolded state. It may be understood that in other embodiments, it is feasible to provide the right-angle folding hinges 103 only, so that the screen body 110 can be folded along the middle lines and one diagonal of the screen body 110, so as to be selectively folded to form the first folded state or the second folded state.

The foldable screen 100 has three usage forms. Optionally, the foldable screen 100 will be described as an example when it is used in a mobile terminal such as a mobile phone. When the foldable screen 100 is in the fully unfolded state, the single-sided display area has maximum single-sided display area and high screen-to-body ratio, which enables a user to have the best experience in watching videos or games, is suitable for entertainment or enjoying scenarios. This state may be called an entertainment form. When the foldable screen 100 is in the first folded state, that is, when the single-sided display area is a half of the full screen, the foldable screen is suitable for answering or making phone calls, replying messages or emails, or the like, and it is better for users to switch to the first folded state when using functions such as calls and emails. This state may also be called an official form. When the foldable screen 100 is in the second folded state, that is, when the single-sided display area is one quarter of the full screen, the foldable screen is suitable for folding and storage, and is convenient to carry. In this case, the foldable screen 100 is small in size, occupies less space and is easy to carry. This state may also be called a portable form. Compared with a traditional fixed-size screen, the effective display area of the screen in the fully unfolded state is larger, and the user will have better operating experience when watching videos or playing games. In the first folded state, the single-sided display area of the foldable screen is equivalent to that of the traditional fixed-size screen, and the usage experience of the traditional fixed-size screen may be retained. In the second folded state, the foldable screen is small in overall dimension, small in volume, convenient to store and carry, and small in occupied space.

Figure 2:
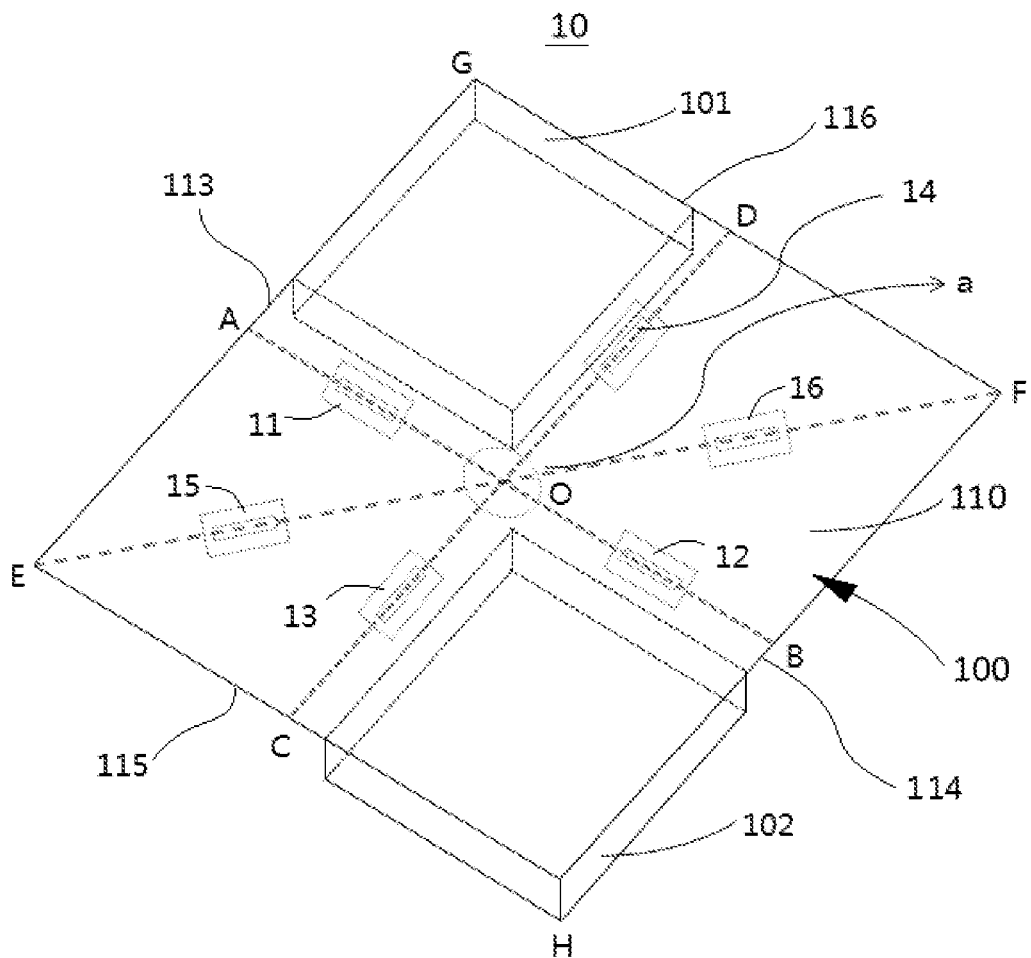
FIG. 2 is a schematic structural diagram of the terminal device in a fully unfolded state provided by the specific embodiment of the present disclosure.
Figure 3:
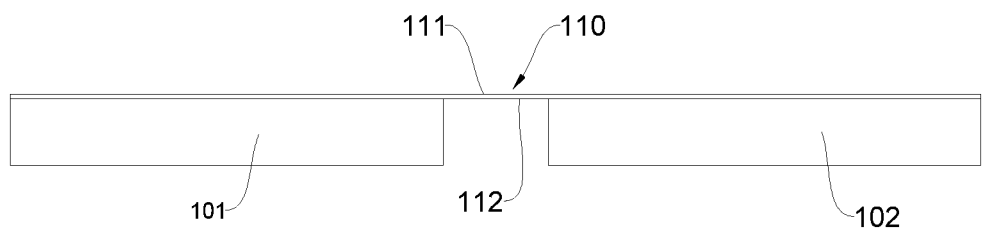
FIG. 3 is a schematic structural diagram of the terminal device in the fully unfolded state provided by the specific embodiment of the present disclosure from another perspective.

In this embodiment, methods for realizing different folded forms of the terminal device 10 are as follows:

Referring to FIG. 1 to FIG. 3, the screen body 110 includes a front face 111 and a back face 112 which are opposite to each other. The front face 111 is a display face, and the back face 112 is configured to mount the battery module 102 and the circuit module 101. The screen body 110 includes the first region a, and the second region. The first region a is located in a central region of the screen body 110 relative to the second region. In other words, the second region is located at a peripheral of the first region a.

Optionally, the screen body 110 is square, the screen body 110 includes a first side edge 113 and a second side edge 114 which are oppositely arranged as well as a third side edge 115 and a fourth side edge 116 which are oppositely arranged. In other words, the first side edge 113, the third side edge 115, the second side edge 114 and the fourth side edge 116 are connected end to end. Side lengths of the first side 113, the second side 114, the third side 115 and the fourth side 116 are all equal, that is, the screen body 110 is roughly square. An intersection of two diagonals of the square screen body 110 is a middle point O of the screen body 110, and the central region is a region near the middle point O, that is, the first region a is the region near the middle point O. In this embodiment, the region indicated by the reference numeral a in the figure may be understood as the first region, and the rest part of the screen body 110 is the second region. It should be understood that the first region a and the second region are relative, which only means that the first region a is located in the middle of the screen body 110 relative to the second region, and does not indicate the actual area of the first region a. Of course, in other alternative embodiments, an area ratio of the first region a to the second region may be appropriately adjusted, which is not specifically limited here.

Optionally, the right-angle folding hinge 103 includes a first folding hinge 11, a second folding hinge 12, a third folding hinge 13, a fourth folding hinge 14, a fifth folding hinge 15 and a sixth folding hinge 16. A middle line of the first side edge 113 and the second side edge 114 is a first middle line AB, and the first middle line AB is a connecting line between a middle point of the first side edge 113 and a middle point of the second side edge 114. A middle line of the third side edge 115 and the fourth side edge 116 is a second middle line CD, and the second middle line CD is a connecting line between a middle point of the third side edge 115 and a middle point of the fourth side edge 116. The first middle line AB is provided with the first folding hinge 11 and the second folding hinge 12. The first folding hinge 11 and the second folding hinge 12 are both arranged in the second region and located on both sides of the first region a respectively. The second middle line CD is provided with the third folding hinge 13 and the fourth folding hinge 14. The third folding hinge 13 and the fourth folding hinge 14 are both arranged in the second region and located on both sides of the first region a respectively.

The screen body 110 includes two diagonals, that is, a first diagonal EF and a second diagonal EF. The first diagonal EF is provided with the fifth folding hinge 15 and the sixth folding hinge 16. The fifth folding hinge 15 and the sixth folding hinge 16 are both arranged in the second region and located on both sides of the first region a respectively. The circuit module 101 and the battery module 102 are arranged on the same side of the screen body 110, are both arranged on the back face of the screen body 110 and are respectively arranged on two opposite corners of the screen body 110. In this embodiment, the circuit module 101 and the battery module 102 are distributed along the second diagonal GH, and are respectively arranged near two corners of the screen body 110.

Figure 4:
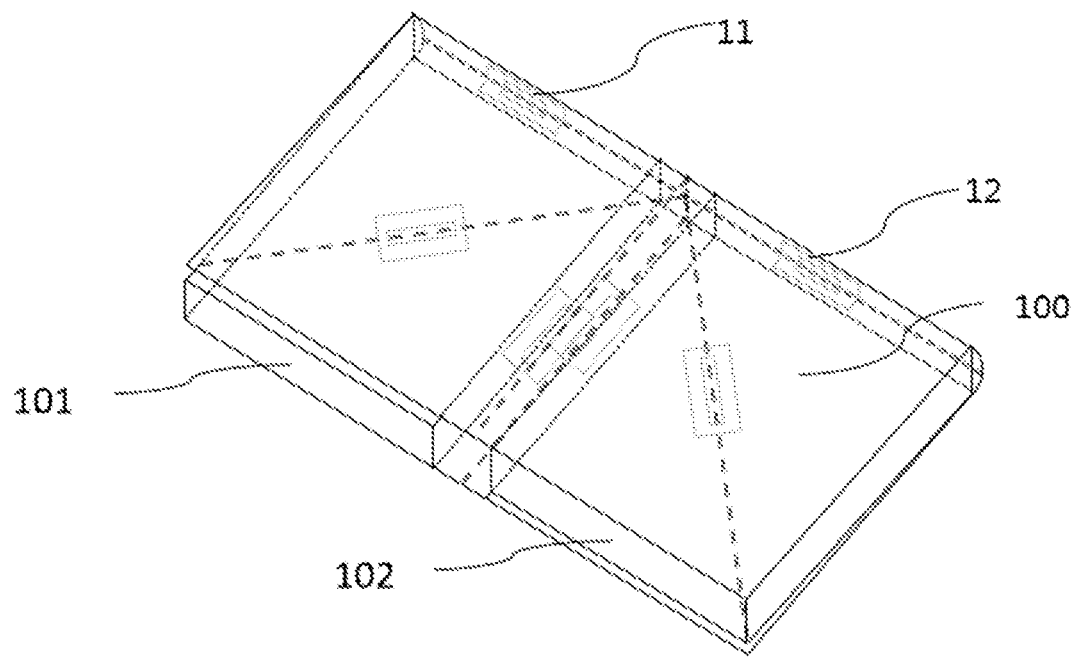
FIG. 4 is a schematic structural diagram of the terminal device in a first folded state provided by the specific embodiment of the present disclosure.

Referring to FIG. 4, when it is necessary to switch from the fully unfolded state to the first folded state, the foldable screen may be folded in half along the first middle line AB, and when the foldable screen is folded in half, the front face 111 faces outward, which is convenient for display, and the back face 112 is folded, that is, the points C and D are close to each other from the back face 112 of the screen body 110. Since the circuit module 101 and the battery module 102 are arranged diagonally, after being folded in this way, the circuit module 101 and the battery module 102 are staggered and do not interfere with each other. Therefore, in the first folded state, a thickness of the foldable screen 100 is unchanged in comparison to that in the fully unfolded state. In addition, when the foldable screen is folded, the front face 111 faces outward. Although the single-sided display area is reduced to half of the original full screen, both sides of the foldable screen can display in the first folded state, so an effective display area of the foldable screen is unchanged in comparison to that in the fully unfolded state.

Similarly, when the foldable screen is folded in half along the second middle line CD, the first folded state may also be formed, the circuit module 101 and the battery module 102 do not overlap after being folded in half, and the thickness of the foldable screen 100 is unchanged in comparison to that in the fully unfolded state, and the effective display area of the foldable screen is also unchanged. This is similar to the case when the foldable screen is folded in half along the first middle line AB, and will not be described in detail here.

If it is necessary to switch from the first folded state to the fully unfolded state, it is only necessary to unfold the overlapped part, that is, the foldable screen is folded along the first folding hinge 11 and the second folding hinge 12 in a tiled form, or folded along the third folding hinge 13 and the fourth folding hinge 14 in a tiled form, which will not be specifically described here.

Figure 5:
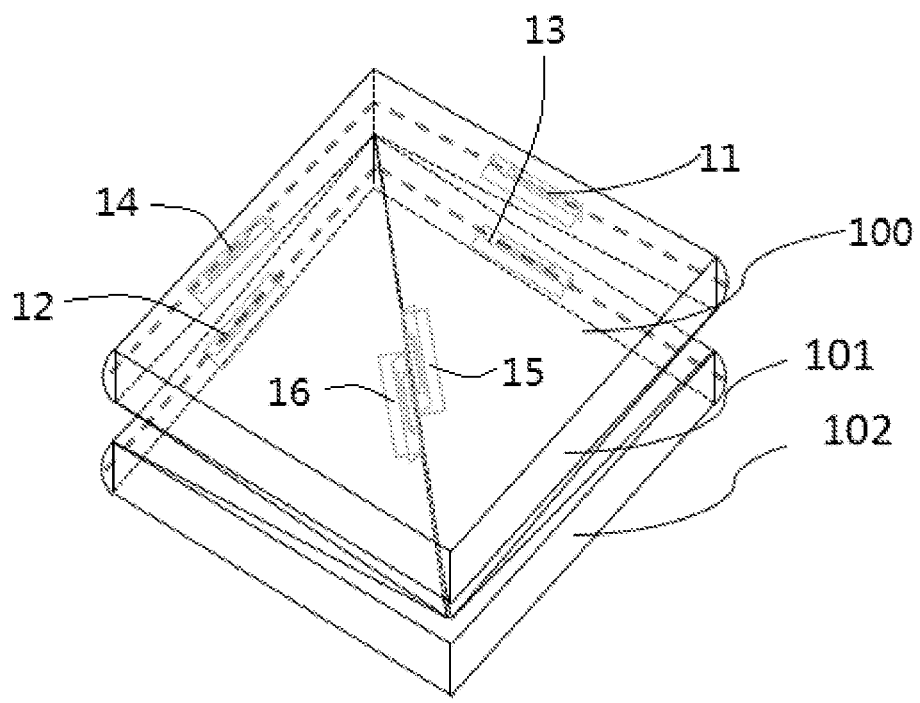
FIG. 5 is a schematic structural diagram of the terminal device in a second folded state provided by the specific embodiment of the present disclosure.

Referring to FIG. 5, when it is necessary to switch to the second folded state, one operable way is: to fold the foldable screen along the first diagonal EF, so that the circuit module 101 and the battery module 102 on the back face 112 of the screen body 110 are close to each other, and the circuit module 101 and the battery module 102 are arranged opposite to each other, that is, the G and H points are close to each other from the back face 112 of the screen body 110. Then, an AECO part of the screen body 110 is folded in half along EO and an FBOD part of the screen body 110 is folded in half along FO, so that E and F points are close to each other from the back face 112 of the screen body 110, A and C points are close to each other from the front face 111 of the screen body 110, and B and D points are close to each other from the front face 111 of the screen body 110.

It should be noted that the being close to each other here means that the two points close to each other are overlapped and close to each other as much as possible after the foldable screen is folded along the hinge. Of course, in practice, due to the thickness of materials, it is impossible to completely fit and overlap the two points. After the foldable screen is folded in this way, a structure as shown in FIG. 5 is formed, and the portable form is formed after the foldable screen is folded. In this portable form, the single-sided display area of the screen is one quarter of that in the fully unfolded state, that is, in the entertainment form. In the portable form, the circuit module 101 and the battery module 102 overlap with each other, so the thickness is increased, which is nearly twice of that in the fully unfolded state. In the second folded state, i.e., in the portable form, the overall size is reduced, which is convenient to store and carry.

If it is necessary to switch the second folded state to the fully unfolded state, it is only necessary to unfold the overlapped part in a fully tiled form, which will not be specifically described here.

Figure 6:
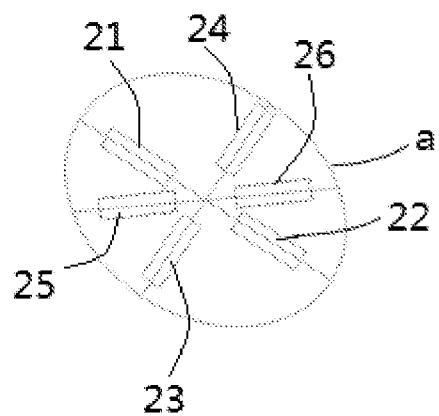
FIG. 6 is a schematic structural diagram of central folding hinges of the terminal device provided by the specific embodiment of the present disclosure.

Referring to FIG. 6, optionally, in order to reduce a stress in the central region of the folded screen body 110, central folding hinges are arranged in the middle of the screen body 110. The central folding hinges include a first central hinge 21, a second central hinge 22, a third central hinge 23, a fourth central hinge 24, a fifth central hinge 25 and a sixth central hinge 26. The first central hinge 21 and the second central hinge 22 are both arranged in the first region a, and the first central hinge 21, the second central hinge 22, the first folding hinge 11 and the second folding hinge 12 are all located on the same straight line, specifically, the straight line is the first middle line AB. Optionally, the first central hinge 21, the second central hinge 22, the first folding hinge 11 and the second folding hinge 12 are arranged at intervals, and the first central hinge 21 and the second central hinge 22 are symmetrically arranged about the point O (that is, the middle point of the screen body 110). The first folding hinge 11 and the second folding hinge 12 are symmetrically arranged about the point O. In other words, a distance from the first central hinge 21 to the point O is equal to a distance from the second central hinge 22 to the point O, and a distance from the first folding hinge 11 to the point O is equal to a distance from the second folding hinge 12 to the point O.

The third central hinge 23 and the fourth central hinge 24 are both arranged in the first region a, and the third central hinge 23, the fourth central hinge 24, the third folding hinge 13 and the fourth folding hinge 14 are all located on the same straight line, specifically, the straight line is the second middle line CD. Optionally, the third central hinge 23, the fourth central hinge 24, the third folding hinge 13 and the fourth folding hinge 14 are arranged at intervals, and the third central hinge 23 and the fourth central hinge 24 are symmetrically arranged about the point O. The third folding hinge 13 and the fourth folding hinge 14 are symmetrically arranged about the point O. In other words, a distance from the third central hinge 23 to the point O is equal to a distance from the fourth central hinge 24 to the point O, and a distance from the third folding hinge 13 to the point O is equal to a distance from the fourth folding hinge 14 to the point O.

The fifth central hinge 25 and the sixth central hinge 26 are both arranged in the first region a, and the fifth central hinge 25, the sixth central hinge 26, the fifth folding hinge 15 and the sixth folding hinge 16 are all located on the same straight line, specifically, the straight line is the first diagonal EF. Optionally, the fifth central hinge 25, the sixth central hinge 26, the fifth folding hinge 15 and the sixth folding hinge 16 are arranged at intervals, and the fifth central hinge 25 and the sixth central hinge 26 are symmetrically arranged about the point O. The fifth folding hinge 15 and the sixth folding hinge 16 are symmetrically arranged about the point O. In other words, a distance from the fifth central hinge 25 to the point O is equal to a distance from the sixth central hinge 26 to the point O, and a distance from the fifth folding hinge 15 to the point O is equal to a distance from the sixth folding hinge to the point O.

It should be noted that in the case that the six central folding hinges do not interfere with each other, the six central folding hinges may be arranged as close to the central point O as possible, that is, the area of the first region a is relatively small, which can ensure that the stress in the center of the screen body is smaller, prevent the breakage and other damage phenomena in the center of the screen body 110 due to excessive stress, and prolong a service life of the screen body 110.

When switching between different usage states, because the right-angle folding hinges 103 and the center folding hinges on the first middle line AB, the second middle line CD and the first diagonal EF are all located on the same straight line, when switching from the fully unfolded state to the first folded state, the foldable screen may be folded along the first folding hinge 11 and the second folding hinge 12 on the first middle line, and may also be folded along the first folding hinge 21 and the second folding hinge 22, or may also be simultaneously folded along the first folding hinge 11, the second folding hinge 12, the first central hinge 21 and the second central hinge 22. Similarly, when switching to other states, the foldable screen may be folded along the central folding hinge, or folded along the right-angle folding hinge 103, or simultaneously folded along the right-angle folding hinge 103 and the central folding hinge, which is not specifically limited here.

Figure 7:
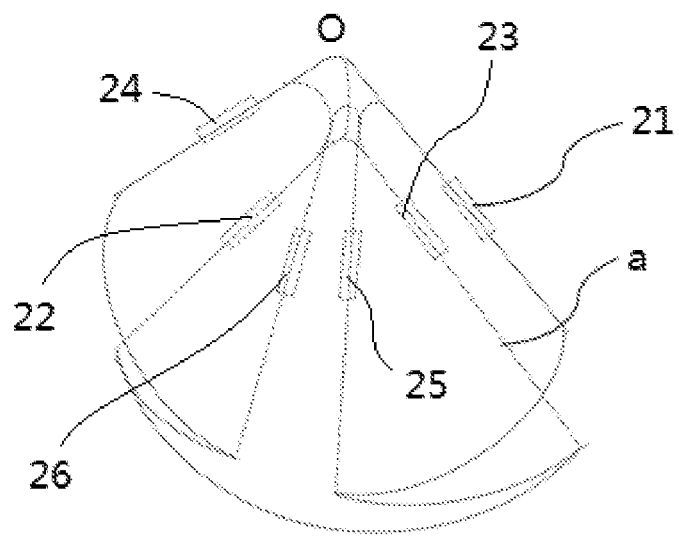
FIG. 7 is a schematic structural diagram of the central folding hinges of the terminal device in the second folded state provided by the specific embodiment of the present disclosure.

Referring to FIG. 7, in this embodiment, six central folding hinges are provided. When the terminal device 10 is in the portable form, that is, when the foldable screen 100 is in the second folded state, a folded structure of the central region of the screen body 110 is in a peak shape composed of two saddle surfaces. This form ensures that the central region of the screen body 110 will not be torn or broken due to excessive stress. The peak-shaped geometric structure can ensure the minimum folding times and achieve the best folding effect.

It should be noted that, the terminal device is based on the characteristics of the OLED flexible screen, and the foldable screen 100 may be applied to a surface of clothes to design clothes that can emit light and change different colors. Optionally, a uniform can be designed based on the foldable screen 100 in this embodiment to widely apply the foldable screen in posts requiring special uniforms such as traffic police, road construction maintenance personnel, sanitation workers, or the like, which are not specifically limited here.

In conclusion, the foldable screen 100 and the terminal device 10 provided by the embodiments have the following beneficial effects:

According to the foldable screen 100 and the terminal device 10 provided by embodiments of the present disclosure, by arranging the right-angle folding hinges 103 and the central folding hinges on the square screen body 110, the switching of three forms can be realized, and different functional forms can be conveniently used in different application occasions. Compared with an existing fixed-size screen, the effective display area of the screen body 110 of the terminal device in the fully unfolded state is larger, and the user will have better operating experience when watching videos or playing games. In the first folded state, the single-sided display area of the foldable screen is equivalent to that of the existing fixed-size screen, and the usage experience of the traditional fixed-size screen may be retained. In the second folded state, the foldable screen is small in overall dimension, convenient to store and carry, and small in occupied space. The terminal device has a wide application range, and may be used not only for electronic devices such as mobile phones, but also for providing users with better experience.

Secondly, by arranging the six central folding hinges in the central region of the screen body 110, the stress in the central region of the screen body 110 can be effectively improved, and the central region of the screen body 110 can be prevented from being torn or broken due to excessive stress, and the distribution of the central folding hinges can ensure the minimum folding times, achieve the best folding effect and prolong the service life of the screen body 110.

The foregoing descriptions are merely detailed embodiments of the present disclosure, but the protection scope of the present disclosure is not limited thereto. Any changes or substitutions that can be easily thought of by those familiar with the technical field within the technical scope disclosed in the present disclosure should be covered by the protection scope of the present disclosure. Therefore, the protection scope of the present disclosure should be subjected to the protection scope of the claims.

In some embodiments:

With reference to FIG. 1, the terminal device 10 as shown in FIG. 1 includes the foldable screen 100, the circuit module 101 and the battery module 102. The foldable screen 100 is provided with the plurality of right-angle folding hinges 103. The circuit module 101 and the battery module 102 are arranged on the same side of the foldable screen 100, and the circuit module 101 and the battery module 102 are located at the opposite corners of the foldable screen 100.

With reference to FIG. 2, the terminal device 10 as shown in FIG. 2 includes the foldable screen 100, the circuit module 101 and the battery module 102. The foldable screen 100 includes the screen body 110 and the plurality of right-angle folding hinges 103. The screen body 110 is a square formed by the first side edge 113, the third side edge 115, the second side edge 114 and the fourth side edge 116 connected end to end. A connecting line between a middle point A of the first side edge 113 and a middle point B of the second side edge 114 is the first middle line AB, a connecting line between a middle point C of the third side edge 115 and a middle point D of the fourth side edge 116 is the second middle line CD, a connecting line between an intersection E of the first side edge 113 and the third side edge 115 and an intersection F of the second side edge 114 and the fourth side edge 116 is the first diagonal EF. a connecting line between an intersection G of the first side edge 113 and the fourth side edge 116 and an intersection H of the second side edge 114 and the third side edge 115 is the second diagonal EF, and an intersection of the first middle line AB, the second middle line CD, the first diagonal EF and the second diagonal is the middle point O of the screen body 110.

The circuit module 101 and the battery module 102 are arranged on the same side of the foldable screen 100, and the circuit module 101 and the battery module 102 are arranged along the second diagonal.

The screen body 110 is provided with the first region a near the middle point O, and the other region of the screen body 110 is the second region. The right-angle folding hinges 103 include the first folding hinge 11, the second folding hinge 12, the third folding hinge 13, the fourth folding hinge 14, the fifth folding hinge 15 and the sixth folding hinge 16. The first folding hinge 11, the second folding hinge 12, the third folding hinge 13, the fourth folding hinge 14, the fifth folding hinge 15 and the sixth folding hinge 16 are all located in the second region, and the first folding hinge 11 is arranged on the connecting line OA, the second folding hinge 12 is arranged on the connecting line OB, the third folding hinge 13 is arranged on the connecting line OC, the fourth folding hinge 14 is arranged on the connecting line OD, the fifth folding hinge 15 is arranged on the connecting line OE, and the sixth folding hinge 16 is arranged on the connecting line OF.

With reference to FIG. 3, the screen body 110 of the foldable screen 100 shown in FIG. 3 has the front face 111 and the back face 112 opposite to each other. The circuit module 101 and the battery module 102 are both arranged on the back face 112, and the circuit module 101 and the battery module 102 are staggered.

With reference to FIG. 4, FIG. 4 illustrates a structure of the terminal device 10 in the first folded state. The foldable screen 100 is folded in half along the first folding hinge 11 and the second folding hinge 12, and the single-sided display area of the foldable screen 100 is a half of that of the fully unfolded state. The circuit module 101 and the battery module 102 are arranged opposite to each other.

With reference to FIG. 5, FIG. 5 illustrates a structure of the terminal device 10 in the second folded state. The foldable screen 100 is folded inwards along OE and OF, and the single-sided display area of the foldable screen 100 is a quarter of that of the fully unfolded state. The circuit module 101 and the battery module 102 are overlapped.

With reference to FIG. 6, FIG. 6 illustrates that the first region a of the foldable screen 100 is provided with a plurality of central folding hinges. The central folding hinges include the first central hinge 21, the second central hinge 22, the third central hinge 23, the fourth central hinge 24, the fifth central hinge 25 and the sixth central hinge 26. The first central hinge 21 is arranged on the connecting line OA, the second central hinge 22 is arranged on the connecting line OB, the third central hinge 23 is arranged on the connecting line OC, the fourth central hinge 24 is arranged on the connecting line OD, the fifth central hinge 25 is arranged on the connecting line OE, and the sixth central hinge 26 is arranged on the connecting line OF.

With reference to FIG. 7, FIG. 7 illustrates a structure of the foldable screen 100 when the plurality of central folding hinges is in the second folded state. The part of the screen body 110 which is located at the center of the plurality of central folding hinges is in a peak shaped composed of two saddle surfaces.

INDUSTRIAL APPLICABILITY

In conclusion, the present disclosure provides a foldable screen and a terminal device. A screen size of the foldable screen is capable of being flexibly changed to adapt to different application scenarios, so the foldable screen has flexible functions, and is convenient to use.

What is claimed is:

1. A foldable screen, comprising a screen body and a plurality of right-angle folding hinges, wherein the plurality of right-angle folding hinges are arranged along middle lines and one diagonal of the screen body; and the screen body has a fully unfolded state, and the screen body is configured to be folded by the right-angle folding hinges, such that the screen body is selectively folded to form a first folded state or a second folded state; and
   in the first folded state, a single-sided display area of the screen body is a half of an area of the screen body in the fully unfolded state; and in the second folded state, the single-sided display area of the screen body is a quarter of the area of the screen body in the fully unfolded state.

2. The foldable screen according to claim 1, wherein the right-angle folding hinges comprise a first folding hinge and a second folding hinge, the screen body is square, the screen body comprises a first side edge and a second side edge which are oppositely arranged, and the first folding hinge and the second folding hinge are arranged at intervals on a middle line of the first side edge and the second side edge.

3. The foldable screen according to claim 2, wherein the first folding hinge and the second folding hinge are symmetrically arranged about a middle point of the screen body.

4. The foldable screen according to claim 2, wherein the right-angle folding hinge further comprises a third folding hinge and a fourth folding hinge, the screen body further comprises a third side edge and a fourth side edge which are oppositely arranged, and the third folding hinge and the fourth folding hinge are arranged at intervals on a middle line of the third side edge and the fourth side edge.

5. The foldable screen according to claim 4, wherein the third folding hinge and the fourth folding hinge are symmetrically arranged about the middle point of the screen body.

6. The foldable screen according to claim 3, wherein the right-angle folding hinges comprise a fifth folding hinge and a sixth folding hinge, and the fifth folding hinge and the sixth folding hinge are arranged at intervals on one diagonal of the screen body.

7. The foldable screen according to claim 6, wherein the fifth folding hinge and the sixth folding hinge are symmetrically arranged about the middle point of the screen body.

8. The foldable screen according to claim 1, wherein the screen body is further provided with a plurality of central folding hinges; and the plurality of right-angle folding hinges are respectively located at peripheries of the plurality of central folding hinges.

9. The foldable screen according to claim 8, wherein the central folding hinges comprise a first central hinge and a second central hinge; the screen body comprises a first side edge, a third side edge, a second side edge and a fourth side edge which are connected end to end; and the first central hinge and the second central hinge are arranged at intervals on a middle line of the first side edge and the second side edge.

10. The foldable screen according to claim 9, wherein the first central hinge and the second central hinge are symmetrically arranged about a middle point of the screen body.

11. The foldable screen according to claim 9, wherein the central folding hinges further comprise a third central hinge and a fourth central hinge, and the third central hinge and the fourth central hinge are arranged at intervals on a middle line of the third side edge and the fourth side edge.

12. The foldable screen according to claim 11, wherein the third central hinge and the fourth central hinge are symmetrically arranged about the middle point of the screen body.

13. The foldable screen according to claim 9, wherein the central folding hinges further comprise a fifth central hinge and a sixth central hinge, and the fifth central hinge and the sixth central hinge are arranged at intervals on one diagonal of the screen body.

14. The foldable screen according to claim 13, wherein the fifth central hinge and the sixth central hinge are symmetrically arranged about the middle point of the screen.

15. A terminal device, comprising a battery module, a circuit module and the foldable screen according to claim 1, wherein the battery module and the circuit module are both arranged on the foldable screen, and the battery module is electrically connected to the circuit module.

16. The terminal device according to claim 15, wherein the circuit module and the battery module are arranged on the same side of the screen body, and are respectively located on two opposite corners of the screen body.

17. The terminal device according to claim 16, wherein the screen body is square, and the screen body comprises a first diagonal and a second diagonal, wherein two right-angle folding hinges are arranged along the first diagonal, and the circuit module and the battery module are arranged along the second diagonal.

18. The foldable screen according to claim 3, wherein the right-angle folding hinge further comprises a third folding hinge and a fourth folding hinge, the screen body further comprises a third side edge and a fourth side edge which are oppositely arranged, and the third folding hinge and the fourth folding hinge are arranged at intervals on a middle line of the third side edge and the fourth side edge.

19. The foldable screen according to claim 18, wherein the third folding hinge and the fourth folding hinge are symmetrically arranged about the middle point of the screen body.

20. The foldable screen according to claim 19, wherein the right-angle folding hinges comprise a fifth folding hinge and a sixth folding hinge, and the fifth folding hinge and the sixth folding hinge are arranged at intervals on one diagonal of the screen body.

\* \* \* \* \*